United States Patent
Bhatoolaul et al.

(10) Patent No.: US 12,028,288 B2
(45) Date of Patent: Jul. 2, 2024

(54) PRECONFIGURED UPLINK RESOURCE CONTROL SIGNALING ENHANCEMENTS

(71) Applicant: NOKIA TECHNOLOGIES OY, Espoo (FI)

(72) Inventors: David Bhatoolaul, Swindon (GB); Rapeepat Ratasuk, Inverness, IL (US); Srinivasan Selvaganapathy, Bangalore (IN); Nitin Mangalvedhe, Hoffman Estates, IL (US)

(73) Assignee: NOKIA TECHNOLOGIES OY, Espoo (FI)

( * ) Notice: Subject to any disclaimer, the term of this patent is extended or adjusted under 35 U.S.C. 154(b) by 367 days.

(21) Appl. No.: 17/430,493

(22) PCT Filed: Feb. 13, 2020

(86) PCT No.: PCT/EP2020/053690
§ 371 (c)(1),
(2) Date: Aug. 12, 2021

(87) PCT Pub. No.: WO2020/165308
PCT Pub. Date: Aug. 20, 2020

(65) Prior Publication Data
US 2022/0140979 A1    May 5, 2022

(30) Foreign Application Priority Data
Feb. 15, 2019  (IN) .............................. 201941006027

(51) Int. Cl.
*H04L 5/00* (2006.01)
*H04W 48/12* (2009.01)

(52) U.S. Cl.
CPC .......... *H04L 5/0055* (2013.01); *H04L 5/0042* (2013.01); *H04W 48/12* (2013.01)

(58) Field of Classification Search
None
See application file for complete search history.

(56) References Cited

U.S. PATENT DOCUMENTS

| | | | |
|---|---|---|---|
| 2017/0331577 A1 | 11/2017 | Parkvall et al. | |
| 2021/0352691 A1* | 11/2021 | Li | H04L 5/0044 |
| 2021/0400567 A1* | 12/2021 | Sha | H04W 76/27 |

(Continued)

OTHER PUBLICATIONS

Communication pursuant to Article 94(3) EPC dated May 3, 2023, corresponding to European Patent Application No. 20705657.3.

(Continued)

*Primary Examiner* — Hong S Cho
(74) *Attorney, Agent, or Firm* — SQUIRE PATTON BOGGS (US) LLP (57) ABSTRACT

Method, apparatuses, and computer program product for overhead reduction are provided. One method may include receiving an allocation of a preconfigured uplink resource and a preconfigured uplink resource radio network temporary identifier associated with the preconfigured uplink resource. The method may also include receiving an assignment of a control channel search space associated with the preconfigured uplink resource. The method may further include monitoring, according to a specified occasion cycle, the control channel search space for a message. In addition, the message may be received according to a specific receive pattern.

12 Claims, 6 Drawing Sheets

(56) References Cited

U.S. PATENT DOCUMENTS

| | | | | |
|---|---|---|---|---|
| 2021/0410166 A1* | 12/2021 | Shrestha | ............... | H04L 5/0055 |
| 2022/0015089 A1* | 1/2022 | Shin | ...................... | H04W 72/21 |
| 2022/0046721 A1* | 2/2022 | Yan | ...................... | H04W 72/12 |
| 2022/0141810 A1* | 5/2022 | Takeda | ................ | H04W 74/002 370/330 |

OTHER PUBLICATIONS

3GPP TSG RAN WG1 Meeting #95 (Nov. 2018), Support for transmission in preconfigured UL resources for NB-IoT. Spokane, USA, Nov. 12-16, 2018.
Office Action dated May 31, 2023, corresponding to Indian Patent Application No. 201941006027.
International Search Report and Written Opinion dated May 4, 2020 corresponding to International Patent Application No. PCT/EP2020/053690.
Sony, "Considerations on Pre-configured Uplink Resource," 3GPP Draft; R1-1812754, 3GPP TSG RAN WG1 Meeting #95, Spokane, USA, Nov. 11, 2018, XP051554T12.
Huawei et al., "Further topics for transmission in preconfigured UL resources," 3GPP Draft; R1-1813762, 3GPP TSG RAN WG1 Meeting #95, Spokane, USA, Nov. 19, 2018, XP051494348.
3GPP TS 36.331 V15.3.0 (Sep. 2018), Technical Specification, 3rd Generation Partnership Project; Technical Specification Group Radio Access Network; Evolved Universal Terrestrial Radio Access (E-UTRA); Radio Resource Control (RRC); Protocol specification (Release 15), Sep. 2018.

* cited by examiner

```
PhysicalConfigDedicated-NB-r13 ::=     SEQUENCE {
    carrierConfigDedicated-r13             CarrierConfigDedicated-NB-r13      OPTIONAL,      -- Need ON
    npdcch-ConfigDedicated-r13             NPDCCH-ConfigDedicated-NB-r13      OPTIONAL,      -- Need ON
    npusch-ConfigDedicated-r13             NPUSCH-ConfigDedicated-NB-r13      OPTIONAL,      -- Need ON
    uplinkPowerControlDedicated-r13        UplinkPowerControlDedicated-NB-r13 OPTIONAL,      -- Need ON
    ...,
    [[ twoHARQ-ProcessesConfig-r14         ENUMERATED {true}  OPTIONAL        -- Need OR
    ]],
    [[ interferenceRandomisationConfig-r14 ENUMERATED {true}  OPTIONAL        -- Need OR
    ]],
    [[ npdcch-ConfigDedicated-v1530        NPDCCH-ConfigDedicated-NB-v1530    OPTIONAL,      -- Cond TDD
    ]]
    Npdcch-ConfigDedicated-PUR             NPDCCH-ConfigDedicated-PUR-NB-r13  OPTIONAL,      -- Need ON
}

NPDCCH-ConfigDedicated-PUR-NB-r13
{
    npdcch-NumRepetitions-r13          ENUMERATED {r1, r2, r4, r8, r16, r32, r64, r128,
                                                   r256, r512, r1024, r2048,
                                                   spare4, spare3, spare2, spare1},
    npdcch-D-PUR-Period                ENUMERATED (same-as-D-PUR-Period , 1/2-D-PUR,1.4-D-PUR)

control-message-occurance          ENUMERATED (4,8,16,64 )  - For every N occurance of NPDCCH
    D-PUR-Pre-emption                  ENUMERATED (enabled , disabled)
    D-PUR-Keepa-Alive                  ENUMERATED (0, 4, 8, 16 )  - 0 means keep alive not enabled.
    npdcch-Offset-D-PUR-USS-r13        ENUMERATED (zero, oneEighth, oneFourth, threeEighth}
}
```

PRECONFIGURED UPLINK RESOURCE CONTROL SIGNALING ENHANCEMENTS

FIELD

Some example embodiments may generally relate to mobile or wireless telecommunication systems, such as Long Term Evolution (LTE) or fifth generation (5G) radio access technology or new radio (NR) access technology, or other communications systems. For example, certain embodiments may relate to apparatuses, systems, and/or methods for enhancing preconfigured uplink resources (PUR) including dedicated preconfigured uplink resources (D-PUR) and shared preconfigured uplink resources (S-PUR).

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. Fifth generation (5G) wireless systems refer to the next generation (NG) of radio systems and network architecture. 5G is mostly built on a new radio (NR), but the 5G (or NG) network can also build on E-UTRA radio. It is estimated that NR will provide bitrates on the order of 10-20 Gbit/s or higher, and will support at least enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. It is noted that, in 5G, the nodes that can provide radio access functionality to a user equipment (i.e., similar to Node B in UTRAN or eNB in LTE) may be named gNB when built on NR radio and may be named NG-eNB when built on E-UTRA radio.

SUMMARY

One embodiment may be directed to a method. The method may include receiving an allocation of a preconfigured uplink resource and a preconfigured uplink resource radio network temporary identifier associated with the preconfigured uplink resource. The method may also include receiving an assignment of a control channel search space associated with the preconfigured uplink resource. The method may further include monitoring, according to a specified occasion cycle (e.g. every N PUR occasions regardless of uplink transmission), the control channel search space for a message. In an example embodiment, the message may be received according to a specific receive pattern (e.g. pattern configured by the eNB which may be different than control message and ACK/NACK occasions, pattern configured by the eNB which is prior to or offset from the PUR opportunity).

Another example embodiment may be directed to an apparatus. The apparatus may include means for receiving an allocation of a preconfigured uplink resource and a preconfigured uplink resource radio network temporary identifier associated with the preconfigured uplink resource. The apparatus may also include means for receiving an assignment of a control channel search space associated with the preconfigured uplink resource. The apparatus may further include means for monitoring, according to a specified occasion cycle, the control channel search space for a message. In an example embodiment, the message may be received according to a specific receive pattern.

Another example embodiment may be directed to an apparatus which may include at least one processor and at least one memory including computer program code. The at least one memory and the computer program code may be configured to, with the at least one processor, cause the apparatus at least to receive an allocation of a preconfigured uplink resource and a preconfigured uplink resource radio network temporary identifier associated with the preconfigured uplink resource. The at least one memory and the computer program code may also be configured to, with the at least one processor, cause the apparatus at least to receive an assignment of a control channel search space associated with the preconfigured uplink resource. The at least one memory and the computer program code may further be configured to, with the at least one processor, cause the apparatus at least to monitor, according to a specified occasion cycle, the control channel search space for a message. In an example embodiment, the message may be received according to a specific receive pattern.

In accordance with some example embodiments, a non-transitory computer readable medium can be encoded with instructions that may, when executed in hardware, perform a method. The method may receive an allocation of a preconfigured uplink resource and a preconfigured uplink resource radio network temporary identifier associated with the preconfigured uplink resource. The method may also receive an assignment of a control channel search space associated with the preconfigured uplink resource. The method may further monitor, according to a specified occasion cycle, the control channel search space for a message. In an example embodiment, the message may be received according to a specific receive pattern.

In accordance with some example embodiments, a computer program product may perform a method. The method may receive an allocation of a preconfigured uplink resource and a preconfigured uplink resource radio network temporary identifier associated with the preconfigured uplink resource. The method may also receive an assignment of a control channel search space associated with the preconfigured uplink resource. The method may further monitor, according to a specified occasion cycle, the control channel search space for a message. In an example embodiment, the message may be received according to a specific receive pattern.

In accordance with some example embodiments, an apparatus may include circuitry configured to receive an allocation of a preconfigured uplink resource and a preconfigured uplink resource radio network temporary identifier associated with the preconfigured uplink resource. The apparatus may also include circuitry configured to receive an assignment of a control channel search space associated with the preconfigured uplink resource. The apparatus may further include circuitry configured to monitor, according to a specified occasion cycle, the control channel search space for a message. In an example embodiment, the message may be received according to a specific receive pattern.

In accordance with some example embodiments, a method may include allocating to a user equipment, a preconfigured uplink resource and a dedicated preconfigured uplink resource radio temporary identifier associated with the preconfigured uplink resource. The method may also include assigning the user equipment a control channel search space associated with the preconfigured uplink resource. The method may further include instructing the user equipment to monitor, according to a specified occasion cycle, the control channel search space for a message. In an example embodiment, the message may be received according to a specific transmission pattern.

In accordance with some example embodiments, an apparatus may include means for allocating to a user equipment, a preconfigured uplink resource and a preconfigured uplink resource radio temporary identifier associated with the preconfigured uplink resource. The apparatus may also include means for assigning the user equipment a control channel search space associated with the preconfigured uplink resource. The apparatus may further include means for instructing the user equipment to monitor, according to a specified occasion cycle, the control channel search space for a message. In an example embodiment, the message may be received according to a specific transmission pattern.

In accordance with some example embodiments, an apparatus may include at least one processor and at least one memory including computer program code. The at least one memory and the computer program code may be configured to, with the at least one processor, cause the apparatus at least to allocate to a user equipment, a preconfigured uplink resource and a preconfigured uplink resource radio temporary identifier associated with the preconfigured uplink resource. The at least one memory and the computer program code may also be configured to, with the at least one processor, cause the apparatus at least to assign the user equipment a control channel search space associated with the preconfigured uplink resource. The at least one memory and the computer program code may further be configured to, with the at least one processor, cause the apparatus at least to instruct the user equipment to monitor, according to a specified occasion cycle, the control channel search space for a message. In an example embodiment, the message may be received according to a specific transmission pattern.

In accordance with some example embodiments, a non-transitory computer readable medium can be encoded with instructions that may, when executed in hardware, perform a method. The method may allocate to a user equipment, a preconfigured uplink resource and a preconfigured uplink resource radio temporary identifier associated with the preconfigured uplink resource. The method may also assign the user equipment a control channel search space associated with the preconfigured uplink resource. The method may further instruct the user equipment to monitor, according to a specified occasion cycle, the control channel search space for a message. In an example embodiment, the message may be received according to a specific transmission pattern.

In accordance with some example embodiments, a computer program product may perform a method. The method may allocate to a user equipment, a preconfigured uplink resource and a preconfigured uplink resource radio temporary identifier associated with the preconfigured uplink resource. The method may also assign the user equipment a control channel search space associated with the preconfigured uplink resource. The method may further instruct the user equipment to monitor, according to a specified occasion cycle, the control channel search space for a message. In an example embodiment, the message may be received according to a specific transmission pattern.

In accordance with some embodiments, an apparatus may include circuitry configured to allocate to a user equipment, a preconfigured uplink resource and a preconfigured uplink resource radio temporary identifier associated with the preconfigured uplink resource. The apparatus may also include circuitry configured to assign the user equipment a control channel search space associated with the preconfigured uplink resource. The apparatus may further include circuitry configured to instruct the user equipment to monitor, according to a specified occasion cycle, the control channel search space for a message. In an example embodiment, the message may be received according to a specific transmission pattern.

BRIEF DESCRIPTION OF THE DRAWINGS

For proper understanding of the invention, reference should be made to the accompanying drawings, wherein.

DETAILED DESCRIPTION

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for enhancing preconfigured uplink resources (PUR) including dedicated preconfigured uplink resources (D-PUR) and shared preconfigured uplink resources (S-PUR).

The features, structures, or characteristics of example embodiments described throughout this specification may be combined in any suitable manner in one or more example embodiments. For example, the usage of the phrases "certain embodiments," "an example embodiment," "some embodiments," or other similar language, throughout this specification refers to the fact that a particular feature, structure, or characteristic described in connection with an embodiment may be included in at least one embodiment. Thus, appearances of the phrases "in certain embodiments," "an example embodiment," "in some embodiments," "in other embodiments," or other similar language, throughout this specification do not necessarily all refer to the same group of embodiments, and the described features, structures, or characteristics may be combined in any suitable manner in one or more example embodiments.

Additionally, if desired, the different functions or steps discussed below may be performed in a different order and/or concurrently with each other. Furthermore, if desired, one or more of the described functions or steps may be optional or may be combined. As such, the following description should be considered as merely illustrative of the principles and teachings of certain example embodiments, and not in limitation thereof.

A new work item (WI) for further enhancements to machine-type communication/narrowband-Internet-of-Things (MTC/NB-IoT) has been approved for Rel-16. An objective of the WI is to support transmission over preconfigured uplink resources (PUR) for a user equipment (UE) having a valid timing advance in idle mode or connected mode. For small data transmission from an idle state using PUR directly without the random access procedure, the resource assignment may be dedicated to a single user or shared across multiple users. In cases of shared resources, contention based and contention free resource allocation schemes may be possible.

Several radio access network working group 2 (RAN2) agreements may relate to preconfigured uplink resource (PUR) transmission. For instance, in RAN2 #103bis agreements, transmissions in dedicated preconfigured uplink resources in idle mode may be supported for UEs with a valid timing advance. Further, there has been a focus on D-PUR in idle mode.

Under RAN2 #104 agreements, the enhanced node B (eNB) may configure the D-PUR via radio resource control (RRC) dedicated signaling. Methods for the eNB to obtain information used to help configuring the D-PUR to the UE is for further study, and periodic D-PUR with a duration is supported. Further, whether one shot D-PUR is supported is also for further study, and release of the D-PUR may be supported. In addition, details for network (NW) triggered and UE triggered are for further study.

According to certain example embodiments, a design of control message signaling toward the devices configured with PUR may be provided. PUR, in certain example embodiments, may include D-PUR and S-PUR. The D-PUR may include the search space design and possible means to communicate PUR related control messages toward the UE.

A use-case associated with D-PUR for small data transmission from idle mode devices include regular reports such as, for example, Mobile Autonomous Reports. The reports may be generated from stationary devices with a defined periodicity and a fixed size associated with it. However, an eNB may need to configure pre-configured resources for multiple such UEs having the same duration in a non-overlapping manner for the uplink transmission. Further, control signaling for these devices may be required for various purposes.

One purpose occurs after the uplink transmission over the D-PUR. Here, the UE may need to obtain a hybrid automatic repeat request (HARQ) acknowledgment-negative acknowledgment (HARQ-ACK/NACK) from the eNB for the physical layer transmission. The UE may also need to obtain acknowledgment from higher layers such as the radio link control/radio resource control (RLC/RRC) to confirm the secured reception of the packet. For this purpose, the UE may need to listen to a narrowband physical downlink control channel (NPDCCH)/machine-type communication (MTC) physical downlink control channel (MPDCCH) after the transmission of the D-PUR or S-PUR transmission.

Control signaling may also be required for the purpose in which the eNB desires to release the D-PUR resource allocation completely or wants to pre-empt specific D-PUR resource allocation. The eNB may want to do this to allow scheduling of other higher priority traffic. The eNB may also need to reconfigure the resource allocation scheme for the already assigned resources. Finally, another purpose may be when the eNB needs to release the D-PUR due to inactivity from the devices detected over the D-PUR resources. Thus, there is a need to provide a UE with knowledge of the occasion/search space to be monitored in the downlink related to its D-PUR transmission. Further, since a mechanism on how the D-PUR control messages are scheduled along with D-PUR acknowledgements are not known, it may be desirable for the UE to know various D-PUR resource managements. This requires a new search space for the D-PUR UE. In addition, monitoring of the new search space for different control messages in a different way is required for energy efficient D-PUR monitoring.

Certain example embodiments may provide various methods related to the operation of uplink transmission using D-PUR in idle mode. As previously noted, the D-PUR control channel may include a search space. In certain example embodiments, every UE may be configured with a search space and a D-PUR radio network temporary identifier (RNTI). The search space (e.g., D-PUR control message search space or control channel search space) and D-PUR-RNTI may be assigned with dedicated resources with a specific periodicity. According to an example embodiment, the search space may be a search space for a downlink control channel associated with a D-PUR. In another example embodiment, the search space may be configured for receiving a downlink control channel, and configured together with the PUR. The search space may also be a search space for the downlink control channel associated with the D-PUR.

In another example embodiment, the D-PUR-RNTI may be based on the D-PUR configuration. For example, the D-PUR-RNTI may be configured together with a D-PUR resource set. In this case, the UE may be allocated a D-PUR resource set and a D-PUR-RNTI associated with the resource set.

According to another example embodiment, if there are multiple D-PUR resource allocations for a single UE, the UE may be assigned with a single D-PUR-RNTI. The UE may also be assigned an additional identifier to differentiate the D-PUR allocation. This may be required if a single D-PUR control search space is shared for all allocations.

In a further example embodiment, the periodicity of the search space may be the same as the D-PUR periodicity. In addition, the starting position of this search space with respect to the D-PUR opportunity may be defined. For example, the starting position of the search space may be defined using an offset from the D-PUR opportunity. Alternatively, the starting position of the search space may be defined in relation to the pre-defined downlink HARQ-ACK timing. In some embodiments, a NACK for the D-PUR may be transmitted within the search space, for example, within the DCI transmitted in the search space.

According to certain example embodiments, D-PUR search space monitoring may be defined for D-PUR resource management messages. For instance, in an example embodiment, the search space may be used to send at least two types of D-PUR messages. The first type of D-PUR message may include downlink control information (DCI) containing NACK for the D-PUR transmission. This may be followed by an uplink allocation for retransmission. Alternatively, the DCI may include resource allocation on the NPDSCH to send the RRC message/RLC-ACK sent in response to the D-PUR message. In an example embodiment, it may also possible for the eNB to send a D-PUR resource control message along with the RRC message.

In another example embodiment, DCI may be sent including information for resource management in terms of short command of a few bits (i.e., release). Alternatively, the DCI may include NPDSCH resources for sending an RRC message for D-PUR management. Further, in an example embodiment, the DCI may be sent independently even when no ACK is sent.

According to certain example embodiments, when the UE sends uplink transmission using the D-PUR resources, the UE may monitor the search space which occurs immediately after the uplink transmission for ACK/NACK. Further, in addition to monitoring the search space after the D-PUR transmission, the UE may monitor the search space once every N occasions or transmission opportunities irrespective of uplink transmission. According to certain example embodiments, the occasion or an occasion cycle may represent a specific opportunity to transmit data including uplink data. For instance, in PUR, the UE may be configured with a periodic opportunity to transmit uplink data.

These additional monitoring occasions may be meant to receive the D-PUR resource control messages related to the release/reconfiguration of the resources. In an example embodiment, the eNB may also configure the UE to skip the monitoring of the control channel search space for D-PUR resource control message reception on the Nth occasion. For example, the UE may skip the monitoring of the control channel search space for the D-PUR resource control message reception on the Nth occasion if the UE has a valid uplink transmission on the D-PUR prior to this occasion.

According to certain example embodiments, a D-PUR release signal may be provided for pre-emption. In an example embodiment, the release signal may be sent prior to the D-PUR occasion to indicate release or unavailability of the next PUR. In another example embodiment, if the eNB desires to enable pre-emption of specific dedicated PUR resources for higher priority traffic, the eNB may configure a wake up signal (WUS) type signal or ON/OFF type signal to indicate release of a specific D-PUR prior to the D-PUR occurrence. According to another example embodiment, the signal may be a "PUR-release" signal that reuses the sequence similar to the one used for WUS. In addition, an extension of this signal may define a signal carrying 1 bit information that indicates whether the UE should simply skip the next D-PUR only, or also check for the next D-PUR search space for any control message. For example, the signal may indicate transmission of a control message in the next search space. In other words, in an example embodiment, the UE may skip monitoring the search space if it does not detect this signal. This may allow for the possibility of transmitting control messages other than "PUR-release" in the search space. In a further example embodiments, this signal may enable the eNB to convey the release of the current D-PUR, and convey a control message regarding the remaining D-PUR.

In another example embodiment, the WUS-type signal may not carry any information itself, but its detection may inform the UE that it must monitor the next search space for a control message. In other words, when the WUS is not detected, the UE does not monitor the next search space for a control message. According to an example embodiment, the control message may provide at least three indications. For example, the control message may indicate that the UE should skip the next D-PUR. The control message may also indicate release of the remaining D-PUR, and may indicate reconfiguration of the remaining D-PUR.

According to certain example embodiments, the UE may be configured to initiate a keep alive mechanism for D-PUR management to prevent an automatic or implicit release of the D-PUR. For example, in one embodiment, the eNB may configure the D-PUR assigned to a UE to be automatically released if the UE does not transmit at least once every M occasions.

In another example embodiment, the UE may avoid automatic release of the D-PUR due to inactivity. For example, the UE may be configured to send a narrowband physical uplink shared channel F2 (NPUSCH-F2) signal over the D-PUR resources once every M occasions if there was no transmissions during the M occasions. The presence of the NPUSCH-F2 signal may be considered as a keep alive signal from the UE for the D-PUR, and the eNB should not release the D-PUR based on inactivity.

According to an example embodiment, instead of NPUSCH-F2, the UE may also send a short buffer status report (BSR) or a downlink quality report if it defers from an earlier condition on this opportunity instead of the actual payload. Further, in an example embodiment, the eNB may need to attempt decoding for the short packet or NPUSCH-F2 on these occasions.

In an example embodiment, the D-PUR search space may be shared among multiple UEs. That is, in certain example embodiments, each UE may have its own assigned resource (e.g., D-PUR) or have a shared resource (e.g., S-PUR) where more than one UE share the same assigned resource. Specifically, since there may be more than one UE configured with a D-PUR resource that has the same periodicity but with non-overlapping D-PUR resource locations within the period, the D-PUR control search space may be defined to be common for more than one UE. In this case, more than one UE may share the same D-PUR-RNTI along with additional index information to differentiate the D-PUR occasion within the period. Further, the DCI may indicate scheduling of ACK/NACK for more than one UE in this case.

With embodiments described herein, it may be possible to provide a definition of a search space for D-PUR control message transmission with different discontinuous reception (DRX) cycles or receive patterns. Certain example embodiments also provide a definition of a search space for a D-PUR control message along with a WUS to pre-empt specific D-PUR occasions. In other example embodiments, there may be provided a mechanism for the UE to send short NPUSCH over the assigned D-PUR as a keep-alive message or short uplink control messages to prevent automatic release of the D-PUR due to inactivity. Another example embodiment may provide a method for sharing the same search-space and D-PUR-RNTI for more than one UE with additional information to differentiate commands from different D-PUR within the same DCI.

Figure 1:
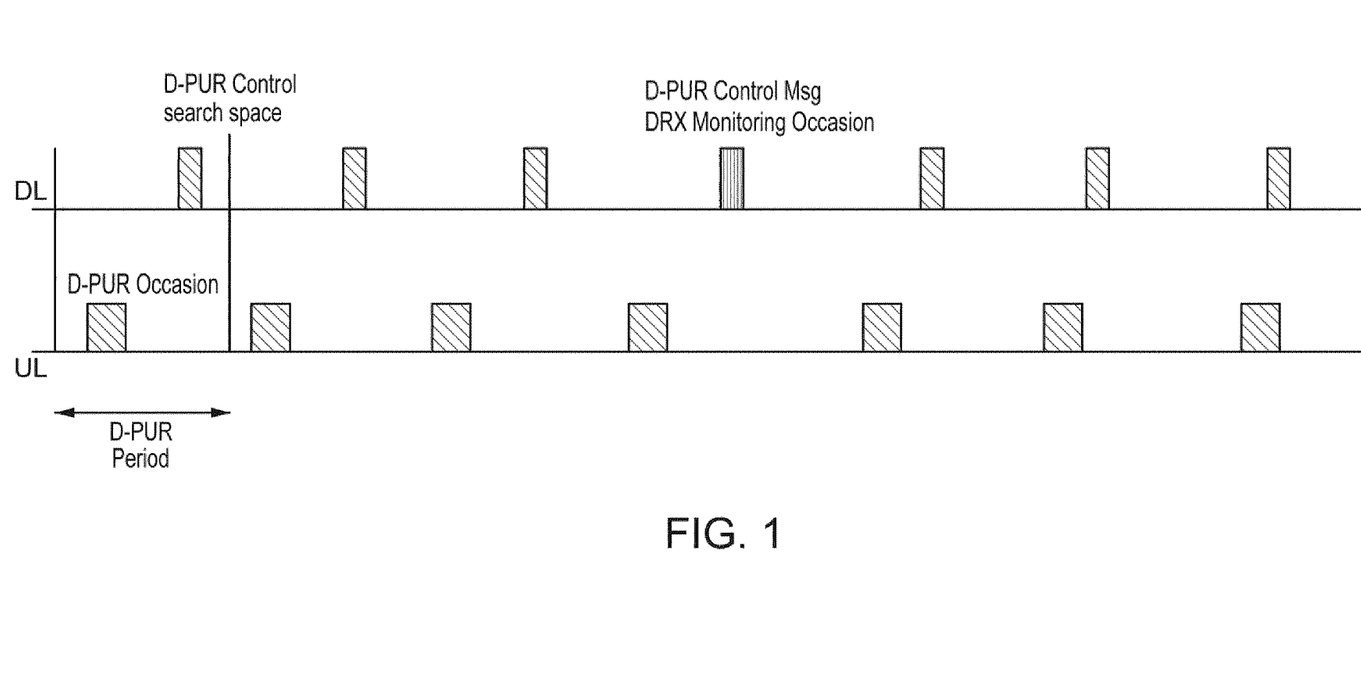
FIG. 1 illustrates an uplink and downlink pattern, according to an example embodiment.

FIG. 1 illustrates uplink and downlink patterns, according to an example embodiment. Specifically, FIG. 1 illustrates the search space for D-PUR ACK/NACK and D-PUR control messages along with the D-PUR opportunities. Further, as illustrated in FIG. 1, the D-PUR search space may be defined to have various lengths, including various combinations of uplink and downlink D-PUR occasions. That is, in certain example embodiments, the D-PUR control search space is not limited to a single downlink and a single uplink D-PUR occasion. In addition, FIG. 1 illustrates a single D-PUR occurrence that contains the control message, and illustrates an uplink and downlink pattern that is defined by a certain D-PUR period. As further illustrated in FIG. 1, each downlink and uplink D-PUR occurrence may be characterized to have a specific periodicity. Further, each of the downlink and uplink D-PUR occurrences do not overlap each other.

According to FIG. 1, if there is an uplink transmission on a D-PUR occasion, the UE may monitor the next D-PUR search space for ACK/NACK, and the control message may be combined here. Otherwise, the UE may wake-up once every N D-PUR search space occasions for receiving control messages. If there was an uplink transmission between the two D-PUR control messages, the UE may skip the next D-PUR search space occasion and check the next occurrence.

Figure 2:
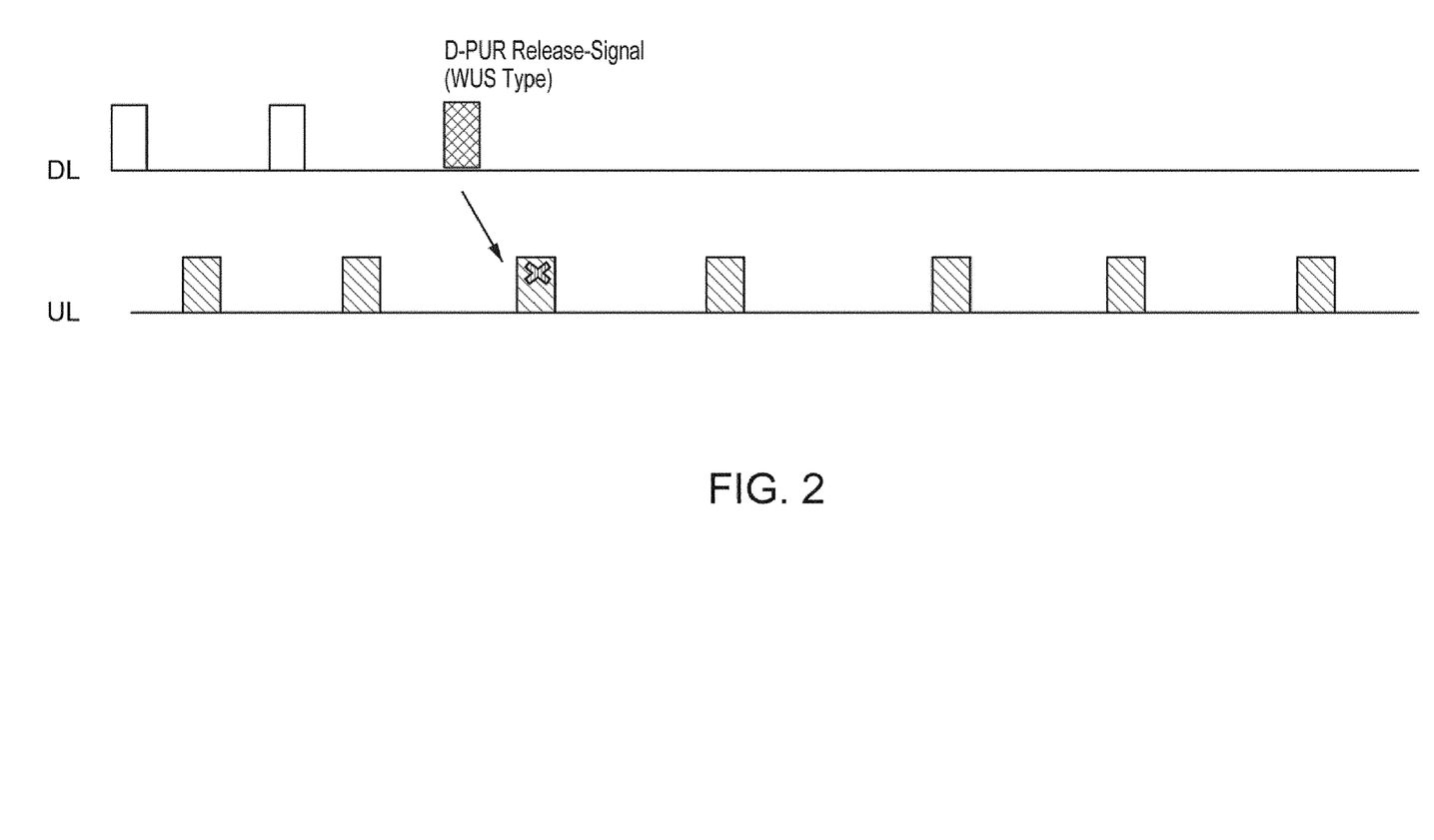
FIG. 2 illustrates another uplink and downlink pattern, according to an example embodiment.

FIG. 2 illustrates another uplink and downlink pattern, according to an example embodiment. Specifically, FIG. 2 illustrates the pre-emption of a specific D-PUR with the help of a WUS-type release signal. As illustrated in FIG. 2, an empty signal means that the D-PUR is available, and the presence of the release signal indicates that the D-PUR will be pre-empted (e.g., uplink signal marked with "x").

Figure 3:
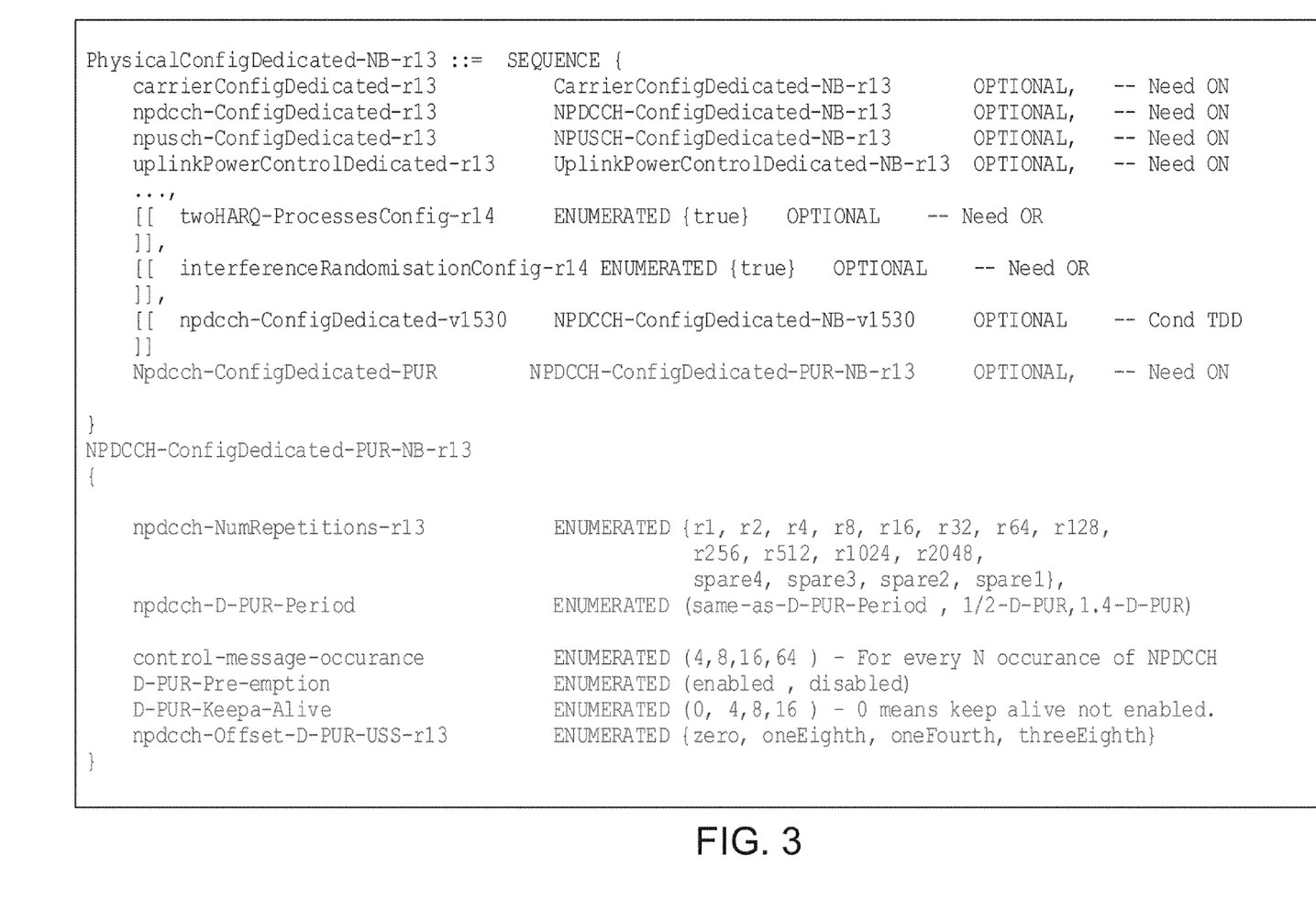
FIG. 3 illustrates a code sequence, according to an example embodiment.

FIG. 3 illustrates a code sequence, according to an example embodiment. For instance, FIG. 3 illustrates a code sequence for the radio resource configuration information, which is modified as shown in FIG. 3 to include the configuration of the various example embodiments described herein.

Figure 4:
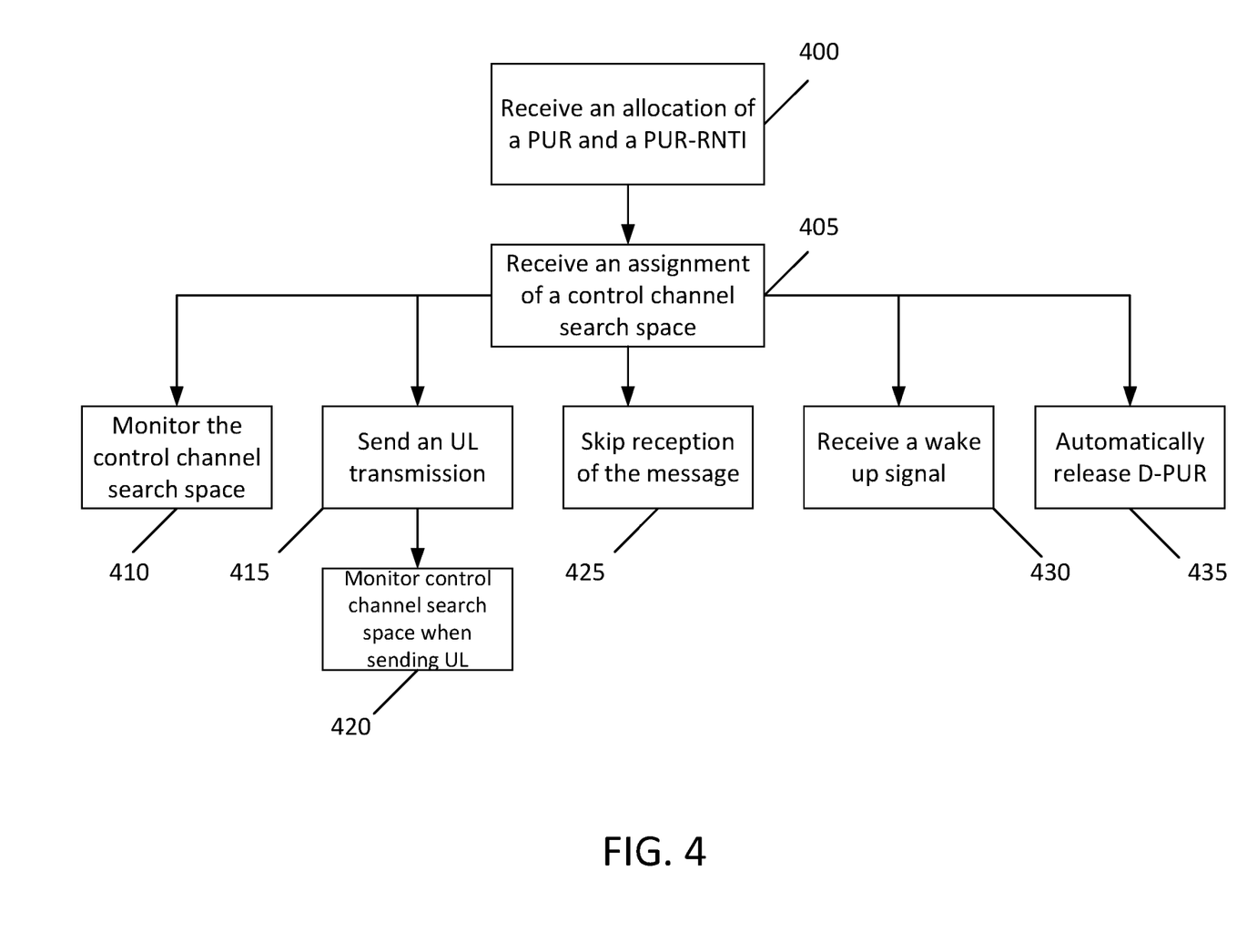
FIG. 4 illustrates an exemplary flow diagram of a method, according to an embodiment.

FIG. 4 illustrates an exemplary flow diagram of a method, according to an embodiment. In certain example embodiments, the flow diagram of FIG. 4 may be performed by a mobile station and/or UE, for instance. According to one example embodiment, the method of FIG. 4 may include initially, at 400, receiving an allocation of a preconfigured uplink resource and a preconfigured uplink resource radio network temporary identifier associated with the preconfigured uplink resource. The method may also include, at 405, receiving an assignment of a control channel search space associated with the preconfigured uplink resource. The method may further include, at 410, monitoring the control channel search space for a message. In an example embodiment, the monitoring may be performed according to a specified occasion cycle. According to another example embodiment, the message may be received according to a specific receive pattern. In a further example embodiment, the message may include a control message, an acknowledgment signal, or a negative-acknowledgement signal.

The method may also include, at 415, sending an uplink transmission in the preconfigured uplink resource. In addition, at 420, the method may include monitoring the control channel search space when sending the uplink transmission or in the absence of any uplink transmission. At 425, the method may include skipping monitoring the control channel search space for the message on a specified occasion when a valid uplink transmission on the preconfigured uplink resource was sent prior to the specified occasion. The method may further include at 430, receiving a signal. Finally, at 435, the method may include automatically releasing the dedicated preconfigured uplink resource when there is no transmission at least once every specified number of occasions. In an example embodiment, the signal may trigger release of the preconfigured uplink resource, provide an indication of unavailability of a subsequent preconfigured uplink resource, or trigger monitoring of the control channel search space.

Figure 5:
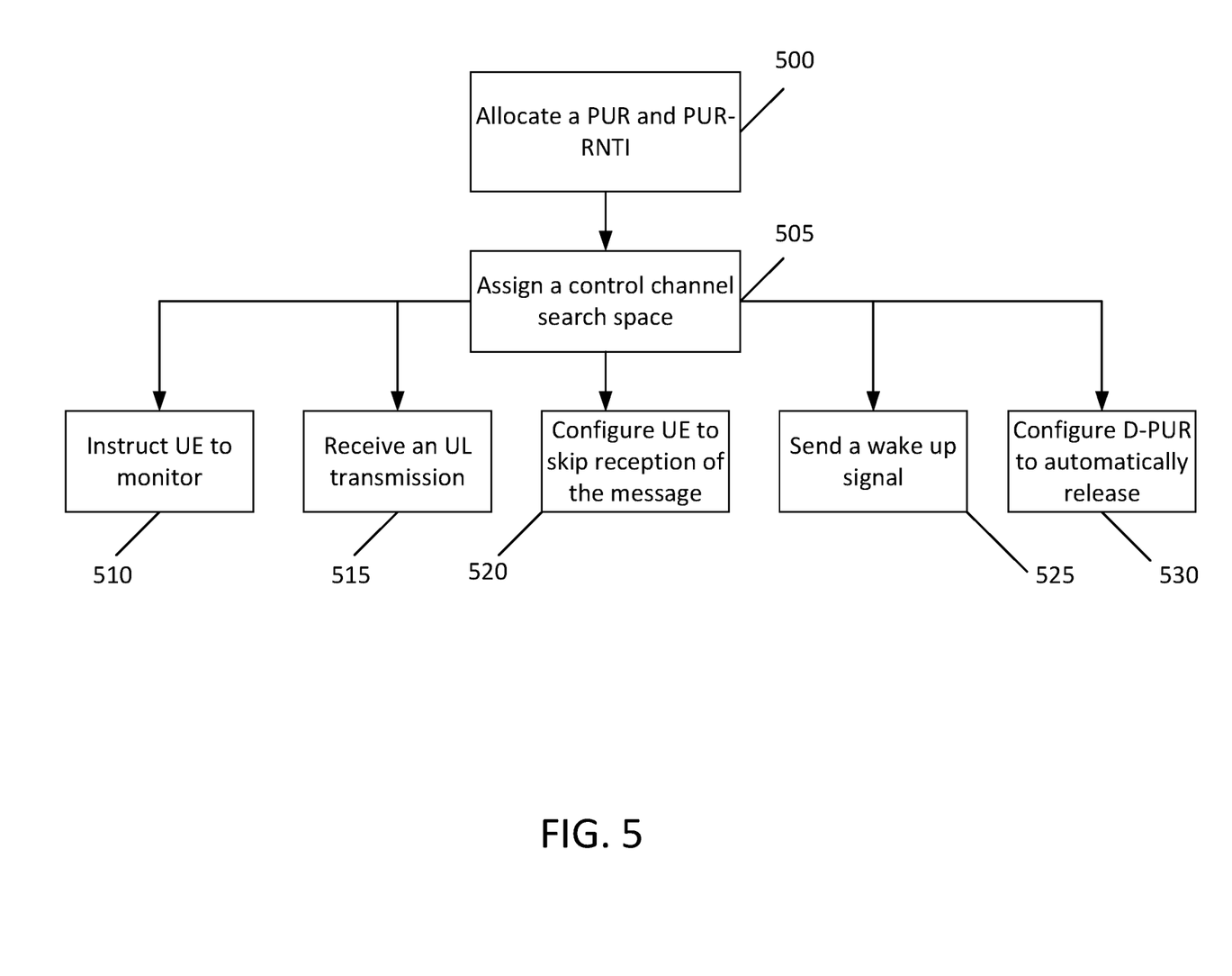
FIG. 5 illustrates an exemplary flow diagram of another method, according to an example embodiment.

FIG. 5 illustrates an example flow diagram of another method, according to an example embodiment. In certain example embodiments, the flow diagram of FIG. 5 may be performed by a network entity or network node in a 3GPP system, such as LTE or 5G NR. For instance, in some example embodiments, the method of FIG. 5 may be performed by a base station, eNB, or gNB.

According to one example embodiment, the method of FIG. 5 may include initially, at 500, allocating to a user equipment, a preconfigured uplink resource and a preconfigured uplink resource radio temporary identifier associated with the preconfigured uplink resource. The method may also include, at 505, assigning the user equipment a control channel search space associated with the preconfigured uplink resource. The method may further include, at 510, instructing the user equipment to monitor the control channel search space for a message. In an example embodiment, the instruction provided to the user may be done according to a specified occasion cycle. According to another example embodiment, the message may be sent according to a specific transmission pattern. In a further example embodiment, the message may include a control message, an acknowledgment signal, or a negative-acknowledgment signal.

At 515, the method may include receiving an uplink transmission in the preconfigured uplink resource. Further, at 520, the method may include configuring the user equipment to skip monitoring the control channel search space for the message on a specified occasion when a valid uplink transmission on the preconfigured uplink resource was received prior to the specified occasion. In addition, at 525, the method may include sending a signal to the user equipment. Finally, at 530, the method may include configuring the preconfigured uplink resource to be automatically released when there is no transmission by the user equipment at least once every specified number of occasions. In an example embodiment, the signal may instruct the user equipment to release of the preconfigured uplink resource, provide an indication of unavailability of a subsequent preconfigured uplink resource, or instruct the user equipment to monitor the control channel search space.

Figure 6A:
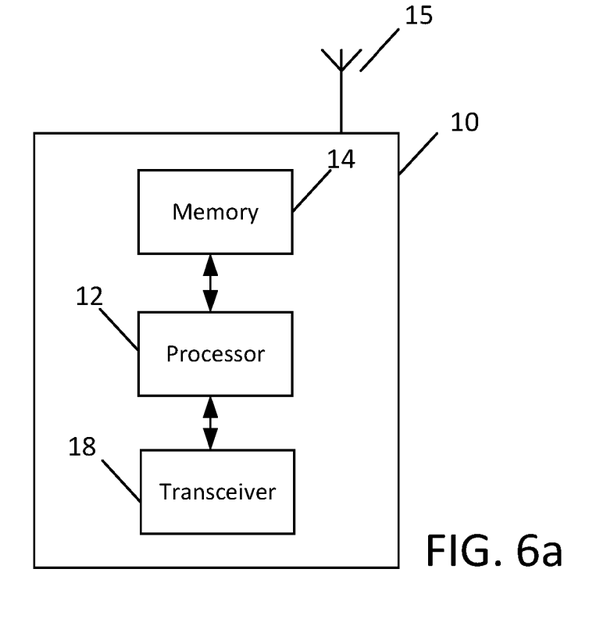
FIG. 6a illustrates a block diagram of an apparatus according to an example embodiment

FIG. 6a illustrates an example of an apparatus 10 according to another embodiment. In an embodiment, apparatus 10 may be a node or element in a communications network or associated with such a network, such as a UE, mobile equipment (ME), mobile station, mobile device, stationary device, IoT device, or other device. As described herein, UE may alternatively be referred to as, for example, a mobile station, mobile equipment, mobile unit, mobile device, user device, subscriber station, wireless terminal, tablet, smart phone, IoT device, sensor or NB-IoT device, or the like.

In some example embodiments, apparatus 10 may include one or more processors, one or more computer-readable storage medium (for example, memory, storage, or the like), one or more radio access components (for example, a modem, a transceiver, or the like), and/or a user interface. In some embodiments, apparatus 10 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 10 may include components or features not shown in FIG. 6a.

As illustrated in the example of FIG. 6a, apparatus 10 may include or be coupled to a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 6a, multiple processors may be utilized according to other embodiments. For example, it should be understood that, in certain example embodiments, apparatus 10 may include two or more processors that may form a multiprocessor system (e.g., in this case processor 12 may represent a multiprocessor) that may support multiprocessing. According to certain example embodiments, the multiprocessor system may be tightly coupled or loosely coupled (e.g., to form a computer cluster).

Processor 12 may perform functions associated with the operation of apparatus 10 including, as some examples, precoding of antenna gain/phase parameters, encoding and decoding of individual bits forming a communication message, formatting of information, and overall control of the apparatus 10, including processes illustrated in FIGS. 1-4.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10 to perform any of the methods illustrated in FIGS. 1-4.

In some embodiments, apparatus 10 may also include or be coupled to one or more antennas 18 for receiving a downlink signal and for transmitting via an uplink from apparatus 10. Apparatus 10 may further include a transceiver 18 configured to transmit and receive information. The transceiver 28 may also include a radio interface (e.g., a modem) coupled to the antenna 15. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly. Additionally or alternatively, in some embodiments, apparatus 10 may include an input and/or output device (I/O device). In certain embodiments, apparatus 10 may further include a user interface, such as a graphical user interface or touchscreen.

In an embodiment, memory 14 stores software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software. According to an example embodiment, apparatus 10 may optionally be configured to communicate with apparatus 10 via a wireless or wired communications link 70 according to any radio access technology, such as NR.

According to certain example embodiments, processor 12 and memory 14 may be included in or may form a part of processing circuitry or control circuitry. In addition, in some embodiments, transceiver 28 may be included in or may form a part of transceiving circuitry.

As discussed above, according to certain example embodiments, apparatus 10 may be a UE, mobile device, mobile station, ME, IoT device and/or NB-IoT device, for example. According to certain embodiments, apparatus 10 may be controlled by memory 14 and processor 12 to perform the functions associated with example embodiments described herein. For example, in some embodiments, apparatus 10 may be configured to perform one or more of the processes depicted in any of the flow charts or signaling diagrams described herein, such as the flow diagrams illustrated in FIGS. 1-4. For example, in certain embodiments, apparatus 10 may be configured to perform a procedure of overhead reduction, for instance.

For instance, in one embodiment, apparatus 10 may be controlled by memory 14 and processor 12 to receive an allocation of a preconfigured uplink resource and a preconfigured uplink resource radio network temporary identifier associated with the preconfigured uplink resource. The apparatus 10 may also be controlled by memory 14 and processor 12 to receive an assignment of a control channel search space associated with the preconfigured uplink resource. The apparatus 10 may further be controlled by memory 14 and processor 12 to monitor, according to a specified occasion cycle, the control channel search space for a message. According to an example embodiment, the message may be received according to a specific receive pattern, and may include a control message, an acknowledgement signal, or a negative-acknowledgement signal.

Figure 6B:
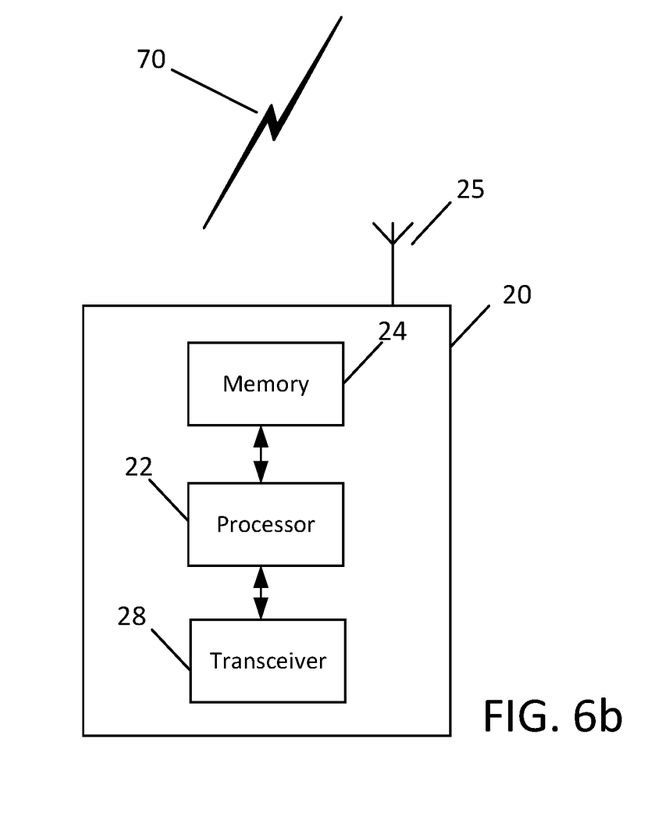
FIG. 6b illustrates a block diagram of another apparatus according to an example embodiment.

FIG. 6b illustrates an example of an apparatus 20 according to an example embodiment. In an example embodiment, apparatus 20 may be a node, host, or server in a communication network or serving such a network. For example, apparatus 20 may be a satellite, base station, a Node B, an evolved Node B (eNB), 5G Node B or access point, next generation Node B (NG-NB or gNB), and/or WLAN access point, associated with a radio access network (RAN), such as an LTE network, 5G or NR. In certain example embodiments, apparatus 20 may be an eNB in LTE or gNB in 5G.

It should be understood that, in some example embodiments, apparatus 20 may be comprised of an edge cloud server as a distributed computing system where the server and the radio node may be stand-alone apparatuses communicating with each other via a radio path or via a wired connection, or they may be located in a same entity communicating via a wired connection. For instance, in certain example embodiments where apparatus 20 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a front-haul interface. The DU may be a logical node that includes a subset of the gNB functions, depending on the functional split option. It should be noted that one of ordinary skill in the art would understand that apparatus 20 may include components or features not shown in FIG. 6b.

As illustrated in the example of FIG. 6b, apparatus 20 may include a processor 22 for processing information and executing instructions or operations. Processor 22 may be any type of general or specific purpose processor. For example, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 6b, multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster).

According to certain example embodiments, processor 22 may perform functions associated with the operation of apparatus 20, which may include, for example, precoding of antenna gain/phase parameters, encoding and decoding of individual bits forming a communication message, formatting of information, and overall control of the apparatus 20, including processes illustrated in FIGS. 1-3 and 5.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20 to perform the methods illustrated in FIGS. 1-3 and 5.

In certain example embodiments, apparatus 20 may also include or be coupled to one or more antennas 25 for transmitting and receiving signals and/or data to and from apparatus 20. Apparatus 20 may further include or be coupled to a transceiver 28 configured to transmit and receive information. The transceiver 28 may include, for example, a plurality of radio interfaces that may be coupled to the antenna(s) 25. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

As such, transceiver 28 may be configured to modulate information on to a carrier waveform for transmission by the antenna(s) 25 and demodulate information received via the antenna(s) 25 for further processing by other elements of apparatus 20. In other embodiments, transceiver 18 may be capable of transmitting and receiving signals or data directly. Additionally or alternatively, in some embodiments, apparatus 20 may include an input and/or output device (I/O device).

In an embodiment, memory 24 may store software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software.

According to some embodiments, processor 22 and memory 24 may be included in or may form a part of processing circuitry or control circuitry. In addition, in some embodiments, transceiver 28 may be included in or may form a part of transceiving circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to case an apparatus (e.g., apparatus 20) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 20 may be a network node or RAN node, such as a base station, access point, Node B, eNB, gNB, WLAN access point, or the like. According to certain embodiments, apparatus 10 may be controlled by memory 24 and processor 22 to perform the functions associated with any of the embodiments described herein, such as the flow or signaling diagrams illustrated in FIGS. 1-3 and 5. In some embodiments, apparatus 20 may be configured to perform a procedure overhead, for example.

For instance, in one embodiment, apparatus 20 may be controlled by memory 24 and processor 22 to allocate to a user equipment, a preconfigured uplink resource and a preconfigured uplink resource radio temporary identifier associated with the preconfigured uplink resource. The apparatus 20 may also be controlled by memory 24 and processor 22 to assign the user equipment a control channel search space associated with the preconfigured uplink resource. The apparatus 20 may further be controlled by memory 24 and processor 22 to instruct the user equipment to monitor, according to a specified occasion cycle, the control channel search space for a message. In an example embodiment, the message may be sent according to a specific transmission pattern, and the message may include a control message, an acknowledgment signal, or a negative-acknowledgment signal.

Certain example embodiments described herein provide several technical improvements, enhancements, and/or advantages. In some example embodiments, a definition of a search space for D-PUR control message transmission may be provided. The control message transmission may include different DRX cycles or receive patterns for eNB control messages, and a D-PUR ACK message. Other example embodiments may provide a definition of a search space for D-PUR control messages along with a signal similar to WUS which may be used to indicate the pre-emption of specific D-PUR occasions. In addition, certain example embodiments may provide a mechanism for a UE to send short NPUSCH over the assigned D-PUR as keep-alive messages or shot uplink control messages to prevent automatic release of the D-PUR due to inactivity.

In a further example embodiment, it may be possible to provide a method for sharing the same search-space and D-PUR-RNTI for more than one UE with the additional information to differentiate commands for different D-PUR within the same downlink control area. According to other example embodiments, it may be possible to provide a design control message signaling towards the devices configured with D-PUR, including the search space design and possible means to communicate the PUR relate control messages towards the UE.

A computer program product may comprise one or more computer-executable components which, when the program is run, are configured to carry out some example embodiments. The one or more computer-executable components may be at least one software code or portions of it. Modifications and configurations required for implementing functionality of an example embodiment may be performed as routine(s), which may be implemented as added or updated software routine(s). Software routine(s) may be downloaded into the apparatus.

As an example, software or a computer program code or portions of it may be in a source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10 or apparatus 20), for example through the use of an application specific integrated circuit (ASIC), a programmable gate array (PGA), a field programmable gate array (FPGA), or any other combination of hardware and software. In yet another example embodiment, the functionality may be implemented as a signal, a non-tangible means that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, including at least a memory for providing storage capacity used for arithmetic operation and an operation processor for executing the arithmetic operation.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. Although the above embodiments refer to 5G NR and LTE technology, the above embodiments may also apply to any other present or future 3GPP technology, such as LTE-advanced, and/or fourth generation (4G) technology.

Partial Glossary

DCI Downlink Control Identifier
D-PUR-RNTI D-PUR Radio Network Temp Identifier
eNB Enhanced Node B (LTE base station)
gNB 5G or NR Base Station
HLR Home Location Register
HSS Home Subscriber Server
LTE Long Term Evolution
NPDCCH-NB-IoT Physical Data Control Channel
NR New Radio
PUR Preconfigure Uplink Resource
UE User Equipment
USS UE specific Search Space
WUS Wake Up Signal

We claim:
1. A method, comprising:
receiving an allocation of a preconfigured uplink resource and a preconfigured uplink resource radio network temporary identifier associated with the preconfigured uplink resource that has a specific periodicity;
receiving an assignment of a control channel search space associated with the preconfigured uplink resource, wherein the control channel search space is associated with a periodicity which is the same as said specific periodicity;
monitoring, according to a specified occasion cycle, the control channel search space for a message; and
automatically releasing the preconfigured uplink resource when there is no transmission at least once every specified number of occasions.
2. The method according to claim 1, wherein the message comprises a control message, an acknowledgement signal, or a negative-acknowledgment signal.

3. The method according to claim 1, further comprising:
monitoring the control channel search space subsequent to sending an uplink transmission or in the absence of any uplink transmission.

4. The method according to claim 1, further comprising:
receiving a signal,
wherein the signal
triggers release of the preconfigured uplink resource,
provides an indication of unavailability of a subsequent preconfigured uplink resource, or
triggers monitoring of the control channel search space.

5. A method, comprising:
receiving an allocation of a preconfigured uplink resource and a preconfigured uplink resource radio network temporary identifier associated with the preconfigured uplink resource;
receiving an assignment of a control channel search space associated with the preconfigured uplink resource;
monitoring, according to a specified occasion cycle, the control channel search space for a message; and
skipping monitoring the control channel search space for the message on a specified occasion when a valid uplink transmission on the preconfigured uplink resource was sent prior to the specified occasion.

6. A method, comprising:
allocating to a user equipment, a preconfigured uplink resource and a preconfigured uplink resource radio temporary identifier associated with the preconfigured uplink resource that has as specific periodicity;
assigning the user equipment a control channel search space associated with the preconfigured uplink resource, wherein the control channel search space is associated with a periodicity which is the same as said specific periodicity;
instructing the user equipment to monitor, according to a specified occasion cycle, the control channel search space for a message; and
configuring the preconfigured uplink resource to be automatically released when there is no transmission by the user equipment at least once every specified number of occasions.

7. The method according to claim 6, wherein the message comprises a control message, an acknowledgment signal, or a negative-acknowledgment signal.

8. The method according to claim 6, further comprising:
receiving an uplink transmission in the preconfigured uplink resource.

9. The method according to claim 6, further comprising:
sending a signal to the user equipment,
wherein the signal
instructs the user equipment to release the preconfigured uplink resource,
provides an indication of unavailability of a subsequent preconfigured uplink resource, or
instructs the user equipment to monitor the control channel search space.

10. A method, comprising:
allocating to a user equipment, a preconfigured uplink resource and a preconfigured uplink resource radio temporary identifier associated with the preconfigured uplink resource;
assigning the user equipment a control channel search space associated with the preconfigured uplink resource;
instructing the user equipment to monitor, according to a specified occasion cycle, the control channel search space for a message; and
configuring the user equipment to skip monitoring the control channel search space for the message on a specified occasion when a valid uplink transmission on the preconfigured uplink resource was received prior to the specified occasion.

11. An apparatus, comprising:
at least one processor; and
at least one memory comprising computer program code,
the at least one memory and the computer program code are configured, with the at least one processor to cause the apparatus at least to
receive an allocation of a preconfigured uplink resource and a preconfigured uplink resource radio network temporary identifier associated with the preconfigured uplink resource that has a specific periodicity;
receive an assignment of a control channel search space associated with the preconfigured uplink resource, wherein the control channel search space is associated with a periodicity which is the same as said specific periodicity;
monitor, according to a specified occasion cycle, the control channel search space for a message; and
automatically release the preconfigured uplink resource when there is no transmission at least once every specified number of occasions.

12. An apparatus, comprising:
at least one processor; and
at least one memory comprising computer program code,
the at least one memory and the computer program code are configured, with the at least one processor to cause the apparatus at least to
allocate to a user equipment, a preconfigured uplink resource and a preconfigured uplink resource radio temporary identifier associated with the preconfigured uplink resource that has a specific periodicity;
assign the user equipment a control channel search space associated with the preconfigured uplink resource, wherein the control channel search space is associated with a periodicity which is the same as said specific periodicity;
instruct the user equipment to monitor, according to a specified occasion cycle, the control channel search space for a message; and
configure the preconfigured uplink resource to be automatically released when there is no transmission by the user equipment at least once every specified number of occasions.

* * * * *